(12) United States Patent
Sugimoto

(10) Patent No.: US 10,298,148 B2
(45) Date of Patent: May 21, 2019

(54) INVERTER CIRCUIT AND DISTRIBUTED POWER SOURCE SYSTEM INCLUDING THE SAME

(71) Applicant: TABUCHI ELECTRIC CO., LTD., Osaka-shi, Osaka (JP)

(72) Inventor: Hidehiko Sugimoto, Osaka (JP)

(73) Assignee: TABUCHI ELECTRIC CO., LTD., Osaka-Shi, Osaka (JP)

( * ) Notice: Subject to any disclaimer, the term of this patent is extended or adjusted under 35 U.S.C. 154(b) by 405 days.

(21) Appl. No.: 15/044,847

(22) Filed: Feb. 16, 2016

(65) Prior Publication Data

US 2016/0241043 A1    Aug. 18, 2016

(30) Foreign Application Priority Data

Feb. 18, 2015  (JP) ................................ 2015-029581

(51) Int. Cl.
*H02M 7/5387* (2007.01)
*H02M 7/797* (2006.01)
*H02J 9/06* (2006.01)
*H02M 1/00* (2006.01)

(52) U.S. Cl.
CPC ......... *H02M 7/5387* (2013.01); *H02M 7/797* (2013.01); *H02J 9/06* (2013.01); *H02M 2001/0051* (2013.01); *Y02B 70/1491* (2013.01)

(58) Field of Classification Search
CPC . H02M 2001/0048; H02M 2001/0051; H02M 7/5387; H02M 7/53871; H02M 7/797
See application file for complete search history.

(56) References Cited

U.S. PATENT DOCUMENTS

| 7,046,534 | B2 | 5/2006 | Schmidt et al. |
| 8,467,212 | B2* | 6/2013 | Mino ................. H02M 1/4208 363/126 |
| 10,038,392 | B2* | 7/2018 | Ohnishi ............... H02M 7/537 |
| 2018/0041138 | A1* | 2/2018 | Nishikawa ............ H02M 7/48 |

FOREIGN PATENT DOCUMENTS

JP    WO 2013136623 A1 *  9/2013    .......... H02M 7/5387

* cited by examiner

*Primary Examiner* — Fred E Finch, III
(74) *Attorney, Agent, or Firm* — Birch, Stewart, Kolasch & Birch, LLP

(57) ABSTRACT

Provided are: a smoothing capacitor connected in parallel to the DC power source; a bridge circuit including switching elements for converting DC power to AC power, flywheel diodes connected in reversely parallel, and flywheel-and-separation diodes connected in series to the flywheel diodes and serving concurrently as flywheel and separation diodes; an interconnection reactor on an output side, provided on AC output lines connecting the bridge circuit and an AC power source; and a separation circuit for separating the smoothing capacitor and the interconnection reactor from each other during a flywheel period of the flywheel diodes. The separation circuit includes separation switching elements and the flywheel-and-separation diodes. The separation switching elements are respectively connected between the two AC output lines and two series connection points between the flywheel diodes and the flywheel-and-separation diodes, so as to short-circuit the AC output lines.

7 Claims, 11 Drawing Sheets

MODE I (IN CASE OF SOLID LINE,
ON SIGNALS ARE GIVEN TO Q1, Q4, Q6)

MODE I (IN CASE OF BROKEN LINE,
ON SIGNALS ARE GIVEN TO Q5, Q6)

MODE II (IN CASE OF SOLID LINE,
ON SIGNALS ARE GIVEN TO Q2, Q3, Q5)

MODE II (IN CASE OF BROKEN LINE,
ON SIGNALS ARE GIVEN TO Q5, Q6)

MODE III (IN CASE OF SOLID LINE,
ON SIGNALS ARE GIVEN TO Q2, Q3, Q5)

MODE III (IN CASE OF BROKEN LINE,
ON SIGNALS ARE GIVEN TO Q5, Q6)

MODE IV (IN CASE OF SOLID LINE,
ON SIGNALS ARE GIVEN TO Q1, Q4, Q6)

MODE IV (IN CASE OF BROKEN LINE,
ON SIGNALS ARE GIVEN TO Q5, Q6)

Fig. 7

|  |  | VOLTAGE OF DIODE | | | |
| --- | --- | --- | --- | --- | --- |
|  |  | D1 | D2 | D5 | D6 |
| (1) | SOLID LINE IN MODE I | O | O | O | E |
| (2) | BROKEN LINE IN MODE I | E/2 | E/2 | O | O |
| (3) | SOLID LINE IN MODE II | O | O | E | O |
| (4) | BROKEN LINE IN MODE II | E/2 | E/2 | O | O |
| (5) | SOLID LINE IN MODE III | O | O | E | O |
| (6) | BROKEN LINE IN MODE III | E/2 | E/2 | O | O |
| (7) | SOLID LINE IN MODE IV | O | O | O | E |
| (8) | BROKEN LINE IN MODE IV | E/2 | E/2 | O | O |

US 10,298,148 B2

INVERTER CIRCUIT AND DISTRIBUTED POWER SOURCE SYSTEM INCLUDING THE SAME

CROSS REFERENCE TO THE RELATED APPLICATION

This application is based on and claims Convention priority to Japanese patent application No. 2015-029581, filed Feb. 18, 2015, the entire disclosure of which is herein incorporated by reference as a part of this application.

BACKGROUND OF THE INVENTION

Field of the Invention

The present invention relates to an inverter circuit which converts DC power of a solar battery, a fuel battery, or the like which is a distributed power source or power supply, to AC power, with high efficiency, so as to be interconnected to a commercial power system or power grid.

Description of Related Art

Conventionally, it is known that DC power generated by a distributed power source such as a solar battery is converted to AC power matched to a commercial power system by an inverter circuit, and the converted AC power is supplied to the power system. The inverter circuit without a transformer therein includes: a smoothing capacitor on the input side, connected in parallel to the solar battery; a bridge circuit which has four switching elements and four flywheel diodes or free wheeling diodes respectively connected in reversely parallel to the switching elements and which converts DC power to AC power through switching; an interconnection reactor and a capacitor on the output side, for converting output current to sinewave current; and an AC power source interconnected to the power system.

However, energy loss occurs due to return of current between the smoothing capacitor and the interconnection reactor, and thus the power conversion efficiency reduces. Considering this, it is known that a separation circuit for separating the smoothing capacitor and the interconnection reactor from each other during flywheel is provided to improve the power conversion efficiency of the inverter circuit (for example, U.S. Pat. No. 7,046,534).

FIG. 13 shows an example of an inverter circuit (HERIC: registered trademark) having the conventional separation circuit. A bridge circuit 104 includes four switching elements Q101 to Q104 and four flywheel diodes D101 to D104 respectively connected in reversely parallel to the switching elements Q101 to Q104. In a separation circuit 106, two reversely parallel connection paths are provided between two AC output lines 11 and 12 of the bridge circuit 104, and on the respective reversely parallel connection paths, a separation switching element Q105 and a separation diode D105 are connected in series, and a separation switching element Q106 and a separation diode D106 are connected in series. The separation diodes D105 and D106 allow current flow in directions opposite to each other. Plus flywheel current flows through the separation switching element Q105 and the separation diode D105, and minus flywheel current flows through the separation switching element Q106 and the separation diode D106. During a period in which the flywheel currents flow, the smoothing capacitor 3 and the interconnection reactor 5 are separated from each other, and energy loss is reduced.

DISCLOSURE OF THE INVENTION

However, in the conventional circuit in FIG. 13, the withstand voltages of the flywheel diodes D101 to D104 in the bridge circuit 104 and the separation diodes D105 and D106 in the separation circuit 106 are all required to be equal to or higher than voltage applied to the smoothing capacitor 3, and therefore the cost increases, resulting in a problem of hampering cost reduction in the entire inverter circuit having the separation circuit.

In the case of using a general diode in the above circuit, there is also a problem that energy loss occurs during a reverse recovery period of the diode.

An object of the present invention is to provide: an inverter circuit in which a smoothing capacitor and an interconnection reactor are separated from each other and the withstand voltages of some or all of flywheel diodes in a bridge circuit are reduced, to achieve cost reduction, and energy loss during a reverse recovery period of a diode is reduced as much as possible, to achieve high power conversion efficiency; and a distributed power source system including the inverter circuit.

In order to achieve the above object, an inverter circuit according to the present invention converts DC power of a DC power source to AC power so as to be interconnected to a power system including an AC power source, and includes: a smoothing capacitor on an input side, connected in parallel to the DC power source; a bridge circuit, configured to convert DC power to AC power, including four switching elements configured, four flywheel diodes connected in reversely parallel to the switching elements, and two or four flywheel-and-separation diodes, separation diodes which also serves as flywheel diode, connected in series to two or four of the flywheel diodes; an interconnection reactor on an output side, provided on two AC output lines connecting the bridge circuit and the AC power source; and a separation circuit configured to separate the smoothing capacitor and the interconnection reactor from each other during a flywheel period of the flywheel diodes in the bridge circuit. The separation circuit includes two separation switching elements and the two or four flywheel-and-separation diodes. In a case where number of the flywheel-and-separation diodes is two, the separation switching elements are respectively connected between the two AC output lines and two series connection points between the flywheel diodes and the flywheel-and-separation diodes, so as to short-circuit the AC output lines. In a case where number of the flywheel-and-separation diodes is four, four series connection points between the flywheel diodes and the flywheel-and-separation diodes are connected, in a mutually crossed manner, by two connection lines via the separation switching elements, and the separation switching elements and the AC output lines are connected via the flywheel-and-separation diodes so as to short-circuit the AC output lines. The term "flywheel period" is a period during which the flywheel diodes allow flywheel current to flow in directions opposite to each other.

In this configuration, among the flywheel diodes and the flywheel-and-separation diodes connected in series, as for voltage applied to, for example, the flywheel diode connected to the positive side or the negative side of the smoothing capacitor, if DC voltage applied to the smoothing capacitor is E, when an ON signal is given to the switching element (given switching element) to which an ON/OFF signal is being given by PWM control in inverter operation, voltage applied to the flywheel diode connected in reversely parallel thereto is 0 V. When an OFF signal is given to the given switching element, since an ON signal is given to the separation switching element, voltage applied to the flywheel diode connected in series to the flywheel-and-separation diode is E/2 if these diodes have almost the same ON resistance. In the flywheel period, when OFF signals are given to all the switching elements, since ON signals are given to the separation switching elements, similarly, voltage applied to the flywheel diode connected in series to the flywheel-and-separation diode is E/2. Thus, in the inverter operation, voltages that exceed E/2 are not applied to the flywheel diodes connected in series to the flywheel-and-separation diodes, and the withstand voltages of the flywheel diodes can be reduced. Thus, the smoothing capacitor and the interconnection reactor are separated from each other by the separation circuit, and the withstand voltages of some or all of the flywheel diodes in the bridge circuit are reduced, whereby cost reduction can be achieved.

Among the flywheel-and-separation diodes and the flywheel diodes mutually connected in series, the flywheel diodes are provided on a DC input line side and the flywheel-and-separation diodes are provided on the AC output line side, in the bridge circuit, and withstand voltages of the respective flywheel diodes are set to be lower than withstand voltages of the flywheel-and-separation diodes. Therefore, the bridge circuit can be formed by the flywheel diode on the DC input line side (the positive side or negative side of the smoothing capacitor), which has, for example, a halved withstand voltage, and the flywheel-and-separation diode. As a result, the cost can be further reduced.

The flywheel diodes are fast recovery diodes, and the flywheel-and-separation diodes are SiC Schottky barrier diodes or GaN Schottky barrier diodes. Therefore, as compared to the case of general diodes, energy loss during a reverse recovery period is reduced as much as possible, and thus high power conversion efficiency can be achieved. The inverter circuit may be operated as a converter. The separation switching elements may have a parasitic diode or a diode connected in reversely parallel.

A distributed power source system according to the present invention includes the inverter circuit in which the DC power source is a distributed power source. In this configuration, since DC power of the distributed power source is converted to AC power with high efficiency by the inverter circuit, a distributed power source system having high power conversion efficiency is obtained.

The distributed power source system further includes a storage battery configured to utilize power generated by the distributed power source. Since DC power of the distributed power source is converted to AC power with high efficiency by the inverter circuit, a distributed power source system with a storage battery having high power conversion efficiency is obtained.

An uninterruptible power supply according to still another aspect of the present invention includes: the inverter circuit in which the DC power source is a distributed power source; a storage battery configured to utilize power generated by the DC power source; and a bidirectional converter, so that the inverter circuit operates as a converter/inverter to perform power conversion between the DC power source and/or the storage battery, and the AC power source. Thus, an uninterruptible power supply having high power conversion efficiency is obtained.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a characteristics diagram showing diode voltage in operation of the inverter circuit in FIG. 1;

DESCRIPTION OF EMBODIMENTS

Figure 1:
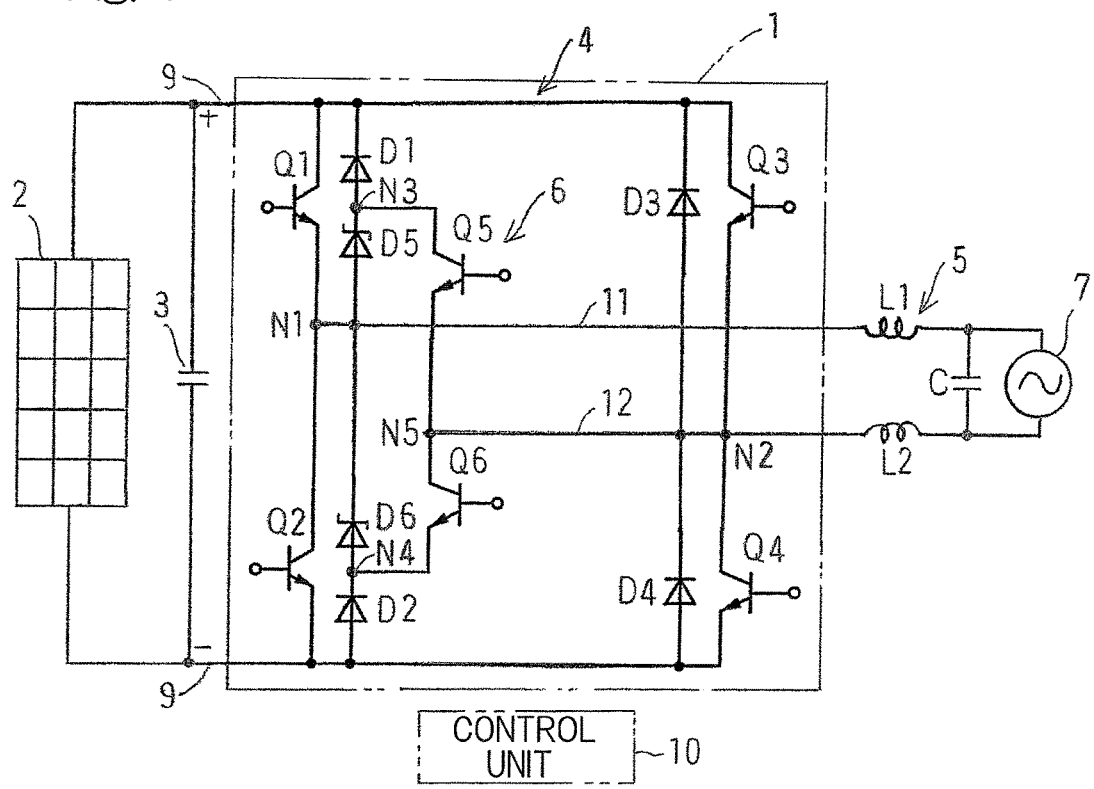
FIG. 1 is a circuit configuration diagram showing a distributed power source system including an inverter circuit according to the first embodiment of the present invention.

FIG. 1 is a circuit configuration diagram showing a distributed power source system including an inverter circuit according to the first embodiment of the present invention. The inverter circuit 1 converts, without a transformer therein, DC power of a DC power source 8 such as a solar battery or a fuel battery which is a distributed power source, to AC power, to perform interconnection to a commercial power system.

The inverter circuit 1 includes: a smoothing capacitor 3 on the input side, which is connected in parallel to a solar battery 2 and intermediately stores DC power of the solar battery 2 in order to smooth and stabilize the DC power; a bridge (full-bridge) circuit 4 which has four switching elements (transistors) Q1 to Q4, four flywheel diodes D1 to D4 connected in reversely parallel to the switching elements Q1 to Q4, and two flywheel-and-separation diodes D5 and D6 respectively connected in series to two of the flywheel diodes D1 to D4 and serving also as flywheel diodes, and which converts DC power to AC power through switching of the transistors Q1 to Q4; an interconnection reactor 5 on the output side, which converts output current to sinewave current; a capacitor C; a separation circuit 6 which separates the smoothing capacitor 3 and the interconnection reactor 5 from each other; an AC power source 7 interconnected to a power system; and a control unit 10 which performs, for example, PWM control to vary a pulse width, with respect to the bridge circuit 4, and controls the entire system.

The separation circuit 6 includes two separation switching elements (transistors) Q5 and Q6, and the two flywheel-and-separation diodes D5 and D6 serving also as flywheel diodes. Among the flywheel diodes D1 to D4, the flywheel diode D1 and the flywheel-and-separation diode D5 are connected in series, and the flywheel diode D2 and the flywheel-and-separation diode D6 are connected in series. Between their series connection points and two AC output lines 11 and 12, the separation transistors Q5 and Q6 are connected so as to short-circuit the AC output lines 11 and 12.

As a switching element, in this example, transistors such as IGBTs are used for the switching elements in the bridge circuit 4 and the separation circuit 6. However, MOSFETs or the like may be used. As a diode, fast recovery diodes (FRDs) are used for the flywheel diodes D1 to D4 in the bridge circuit 4, and SiC Schottky barrier diodes (SiC-SBDs) or GaN Schottky barrier diodes (GaN-SBDs) are used for the flywheel-and-separation diodes D5 and D6 in the separation circuit 6. As compared to a general diode, an SiC-SBD or a GaN-SBD is fast in operation and small in reverse recovery current, and an FRD is short in a reverse recovery time and small in reverse recovery current. Further, in an FRD, reverse current when reverse voltage is applied is smaller than that in an SiC-SBD or a GaN-SBD. Without limitation to the above usage, usage of FRDs and usage of SiC-SBDs or GaN-SBDs may be reversed between the bridge circuit 4 and the separation circuit 6, or all the diodes may be SiC-SBDs or GaN-SBDs, or may be FRDs.

In this example, the flywheel diode D1 and the flywheel-and-separation diode D5 are connected in series, and the flywheel diode D2 and the flywheel-and-separation diode D6 are connected in series. A series connection point N3 between the flywheel diode D1 and the flywheel-and-separation diode D5 is connected to the collector of the separation transistor Q5, and a series connection point N4 between the flywheel diode D2 and the flywheel-and-separation diode D6 is connected to the emitter of the separation transistor Q6. The emitter of the separation transistor Q5 and the collector of the separation transistor Q6 are connected to each other, the AC output line 12 is connected to a connection point N5 therebetween, and to a connection point N2 between the emitter of the transistor Q3 and the collector of the transistor Q4. The emitter of the transistor Q1 and the collector of the transistor Q2 are connected to each other, and the AC output line 11 is connected to a connection point N1 therebetween. That is, among the flywheel diode D1 and the flywheel-and-separation diode D5 connected in series and the flywheel diode D2 and the flywheel-and-separation diode D6 connected in series, the flywheel diodes D1 and D2 (D1 is on the positive side of the smoothing capacitor 3, and D2 is on the negative side of the smoothing capacitor 3) are provided on a DC input line 9 side in the bridge circuit 4, and the flywheel-and-separation diodes D5 and D6 are provided on the AC output lines 11 and 12 side. In a half cycle in which voltage of the AC output line 11 is higher than voltage of the AC output line 12, when OFF signals are given to the transistors Q2 and Q3 and ON signals are given to the transistors Q1 and Q4, the flywheel-and-separation diode D5 is allowed to be ON. In a half cycle in which voltage of the AC output line 12 is higher than voltage of the AC output line 11, when OFF signals are given to the transistors Q1 and Q4 and ON signals are given to the transistors Q2 and Q3, the flywheel-and-separation diode D6 is allowed to be ON. When all the transistors Q1 to Q4 are OFF, the flywheel-and-separation diodes D5 and D6 are allowed to be ON.

That is, among four upper and lower arms of the bridge circuit 4, in this example, on the two upper and lower paired arms at the left, the flywheel-and-separation diodes D5 and D6 are connected in series to the flywheel diodes D1 and D2, respectively.

Among the four switching elements (transistors) Q1 to Q4 composing the full-bridge circuit, the transistors Q1 and Q4 are regarded as a switch pair and the transistors Q2 and Q3 are regarded as a switch pair, and the control unit 10 switches on and off these switch pairs alternately. That is, the control unit 10 performs bipolar switching.

Figure 2:
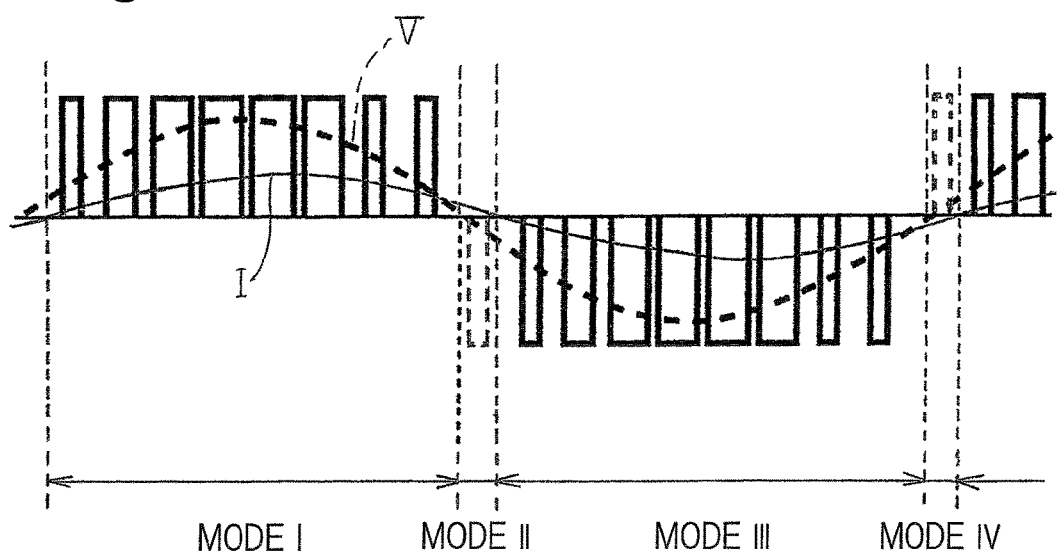
FIG. 2 is a waveform diagram showing modes of the inverter circuit in FIG. 1.

FIG. 2 shows a mode I in which the transistors Q1 and Q4 are switched, a mode II corresponding to a flywheel period, a mode III in which the transistors Q2 and Q3 are switched, and a mode IV corresponding to a flywheel period. FIGS. 3A, 3B to FIGS. 6A, 6B are circuit diagrams showing operations of the inverter circuit 1 in the modes I to IV in FIG. 2. FIG. 7 is a characteristics diagram showing diode voltage in operation of the inverter circuit 1.

In the mode I corresponding to a part of a half cycle of AC output in FIG. 2, the switch pair of the transistors Q2 and Q3 are turned off, and the switch pair of the transistors Q1 and Q4 are switched on and off at a predetermined duty cycle. In the mode I, as shown by a solid-line arrow α in FIG. 3A, during an ON period of the transistors (transistors) Q1 and Q4 to which ON/OFF signals are being given, current flows through the transistors Q1 and Q4 to the AC power source 7 side, whereby current is conducted from the DC side to the AC side. At this time, current I≥0 and voltage V≥0 are satisfied.

Generally, in an inverter circuit, in order to prevent short-circuit of upper and lower arms of a bridge circuit, a dead time which is a period in which upper and lower switching elements are turned off simultaneously at the timing of ON/OFF switching is provided. In the mode I, during ON/OFF switching of the transistor Q1 in PWM control, the separation switching element (transistor) Q6 in the separation circuit 6 is constantly turned on, and when the transistor Q1 is OFF, the reactors L1 and L2 (AC output lines 11 and 12) are short-circuited, so that the dead time is not needed. When the transistor Q1 is ON, the separation transistor Q5 is OFF. Even when the separation transistor Q6 is ON, current passing through the transistor Q1 is blocked by the flywheel-and-separation diode D6 and thus does not flow between the diode D6 and the separation transistor Q6. When the transistor Q1 is OFF, as shown by a broken-line arrow α1 in FIG. 3B, due to the separation transistor Q6 being ON, current flows between the flywheel-and-separation diode D6 and the separation transistor Q6, whereby the reactors L1 and L2 are short-circuited. As a result, it is not necessary to set the dead time, and therefore an AC output waveform close to a sinusoidal waveform is obtained.

In a flywheel diode in a conventional bridge circuit, a reverse recovery period due to ON/OFF switching of a transistor exists constantly. However, during ON/OFF switching of the transistor Q1, even if reverse voltage is applied to the flywheel-and-separation diode D6, since an SiC-SBD is used for the flywheel-and-separation diode D6, a time of reverse recovery from the flywheel-and-separation diode D6 to the separation transistor Q6 hardly exists, and reverse recovery current also hardly flows, so that energy loss due to the reverse recovery current hardly occurs. In addition, since FRDs are used for the flywheel diodes D1 to D4, reverse recovery currents and energy losses therein are also small.

Figure 3A:
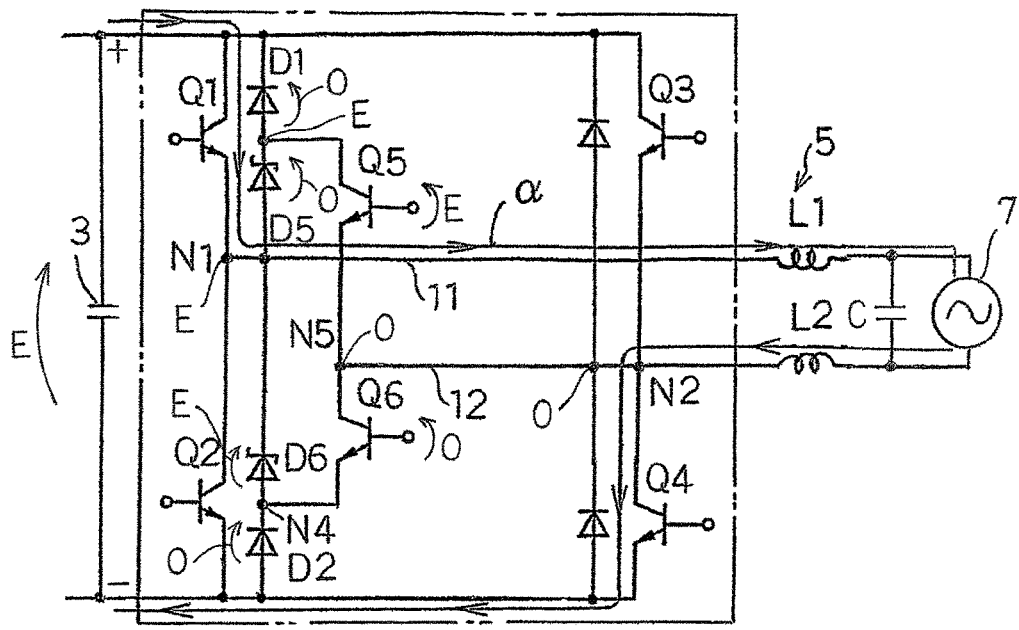
FIG. 3A and FIG. 3B are circuit diagrams showing operations of the inverter circuit in FIG. 1.

In the mode I in FIG. 2, as shown in FIG. 3A, among the flywheel diode D1 and the flywheel-and-separation diode D5 connected in series and the flywheel diode D2 and the flywheel-and-separation diode D6 connected in series, as for voltage applied to the flywheel diode D1 connected to the positive side of the smoothing capacitor 3, if DC voltage applied to the smoothing capacitor 3 is E, when an ON signal is given to the transistor (given transistor) Q1 to which an ON/OFF signal is being given, voltage applied to the flywheel diode D1 connected in reversely parallel thereto is 0 V (row (1) in FIG. 7). Meanwhile, since the transistor Q2 is OFF and the separation transistor Q6 is ON, the voltage E is applied to the flywheel-and-separation diode D6, and voltage applied to the flywheel diode D2 connected to the negative side of the smoothing capacitor 3 is 0 V (row (1) in FIG. 7).

Figure 3B:
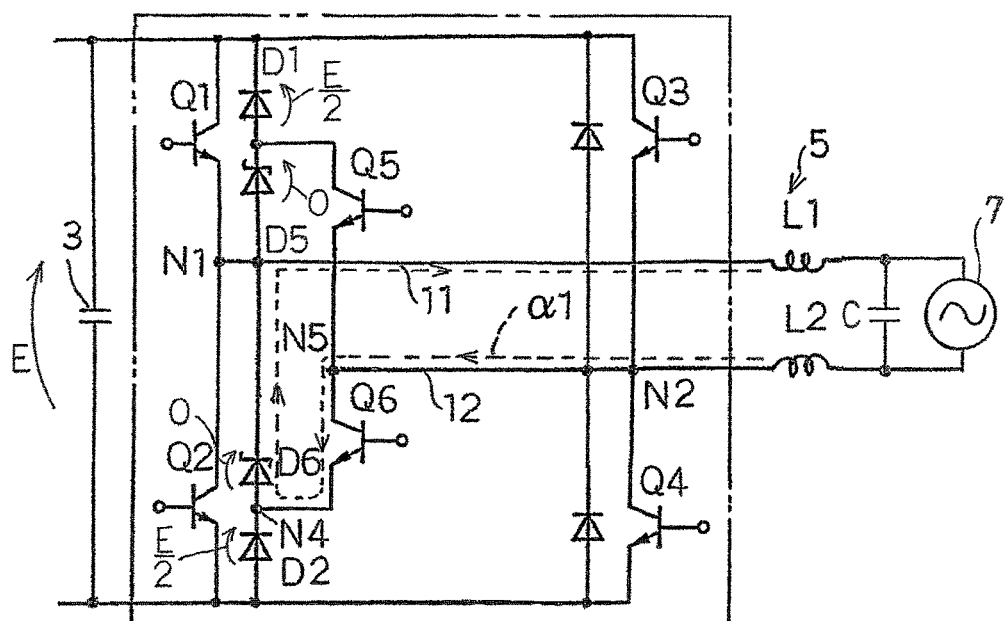

As shown in FIG. 3B, when an OFF signal is given to the transistor Q1, since ON signals are given to the separation transistors Q5 and Q6, if the flywheel-and-separation diodes and the flywheel diodes have almost the same ON resistance, voltages applied to the flywheel diodes D1 and D2 connected in series to the flywheel-and-separation diodes D5 and D6 are each E/2 (row (1) in FIG. 7).

Figure 4A:
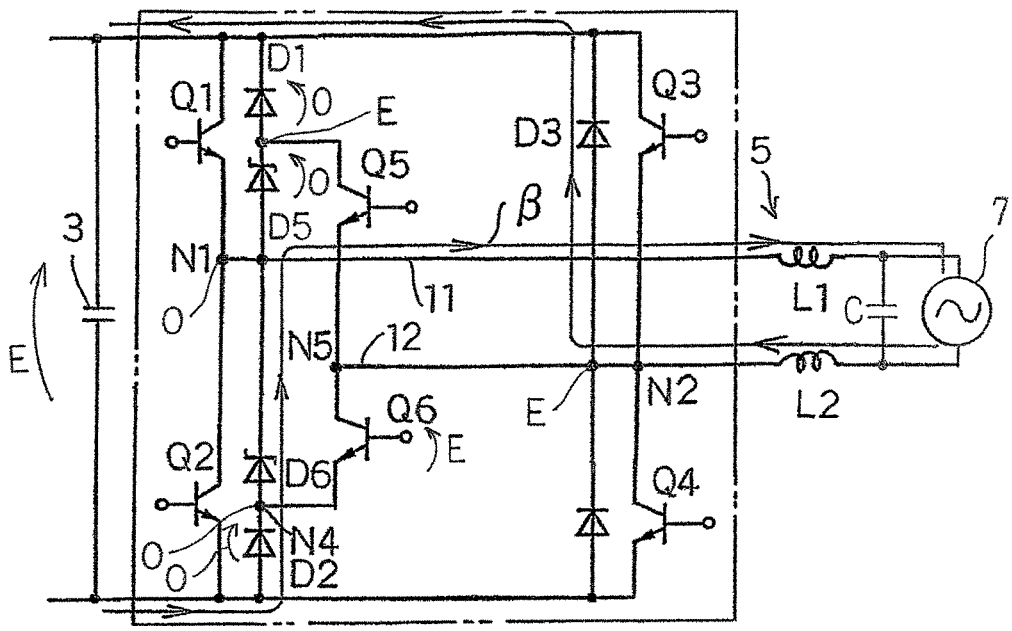
FIG. 4A and FIG. 4B are circuit diagrams showing operations of the inverter circuit in FIG. 1.

In the mode II in FIG. 2, as shown by a solid-line arrow β in FIG. 4A, ON/OFF signals are given to the transistors Q2 and Q3, and the separation transistor Q5 is constantly ON. During a flywheel period in which the flywheel diodes D2 and D3 and the flywheel-and-separation diode D6 are used, electromagnetic energy in the interconnection reactor for smoothing current flows back to the DC side through the AC power source 7 and the diodes D2, D6, and D3. In this flywheel period, as the electromagnetic energy in the interconnection reactor for smoothing current decreases, current flow in the circuit disappears. At this time, current I≥0 and voltage V≤0 are satisfied. When the separation transistor Q6 is OFF and an ON signal is given to the transistor Q2, voltage applied to the flywheel diode D2 connected in reversely parallel thereto on the negative side of the smoothing capacitor 3 is 0 V (row (3) in FIG. 7). Meanwhile, the transistor Q1 is OFF and the separation transistor Q6 is ON, and therefore voltage applied to the flywheel diode D1 on the positive side of the smoothing capacitor 3 is 0 V (row (3) in FIG. 7).

Figure 4B:
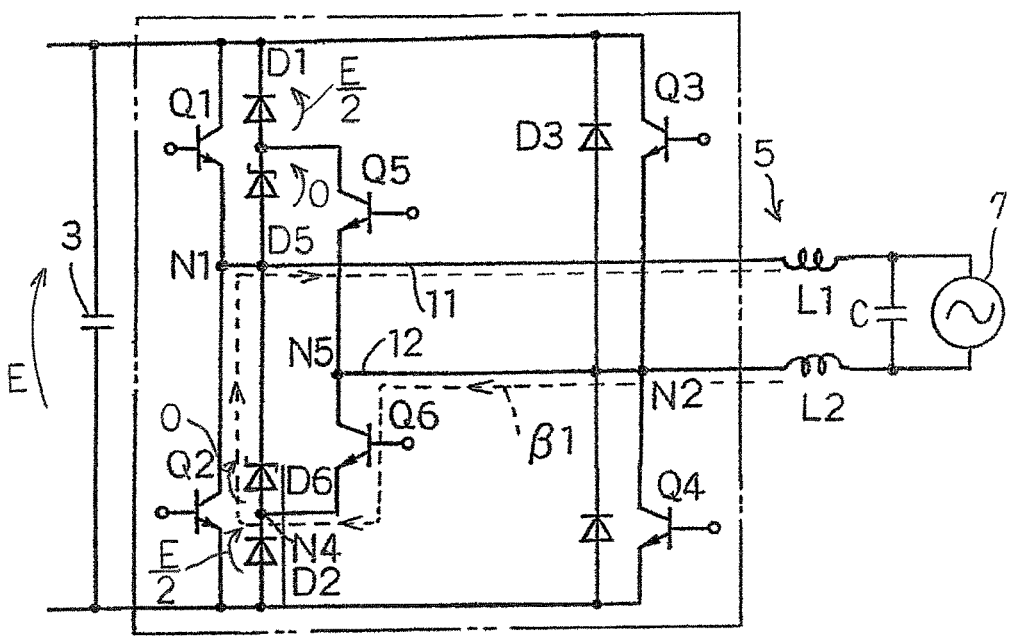

As shown in a broken-line arrow β1 in FIG. 4B, when the transistors Q1 to Q4 are all OFF and the separation transistor Q6 is ON, current flows through the interconnection reactor L2, the separation transistor Q6, the flywheel-and-separation diode D6, and then the interconnection reactor L1, and thus the smoothing capacitor 3 and the interconnection reactor 5 are separated from each other during a flywheel period. When OFF signals are given to all the transistors Q1 to Q4, since ON signals are given to the separation transistors Q5 and Q6, voltages applied to the flywheel diodes D1 and D2 connected in series to the flywheel-and-separation diodes D5 and D6 are each E/2 (row (4) in FIG. 7).

Figure 5A:
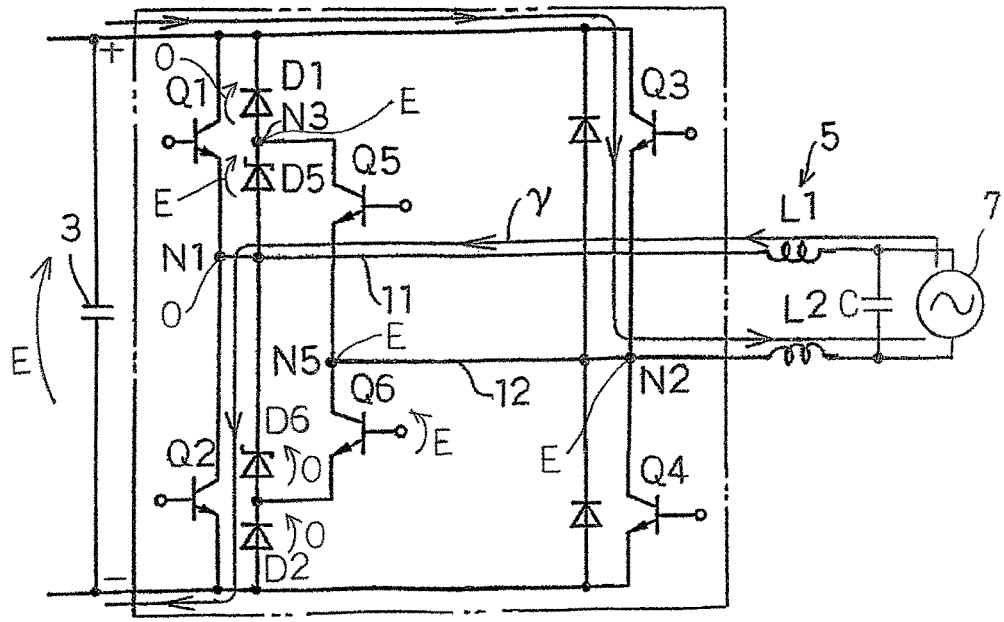
FIG. 5A and FIG. 5B are circuit diagrams showing operations of the inverter circuit in FIG. 1.

In the mode III which is a part of the next half cycle of AC output in FIG. 2, as shown in FIG. 5A, the switch pair of the transistors Q1 and Q4 are turned off, and the switch pair of the transistors Q2 and Q3 are switched on and off at a predetermined duty cycle. In this case, as shown by a solid-line arrow γ, during an ON period of the transistors (transistors) Q2 and Q3 to which ON/OFF signals are being given, current flows through the transistors Q2 and Q3 to the AC power source 7 side, whereby current is conducted from the DC side to the AC side. The separation transistor Q5 is constantly ON. At this time, current I≤0 and voltage V≤0 are satisfied. When an ON signal is given to the transistor Q2, voltage applied to the flywheel diode D2 connected in reversely parallel thereto on the negative side of the smoothing capacitor 3 is 0 V (row (5) in FIG. 7). Meanwhile, since the transistor Q1 is OFF and the separation transistor Q5 is ON, the voltage E is applied to the flywheel-and-separation diode D5, and voltage applied to the flywheel diode D1 connected to the positive side of the smoothing capacitor 3 is 0 V (row (5) in FIG. 7).

Figure 5B:
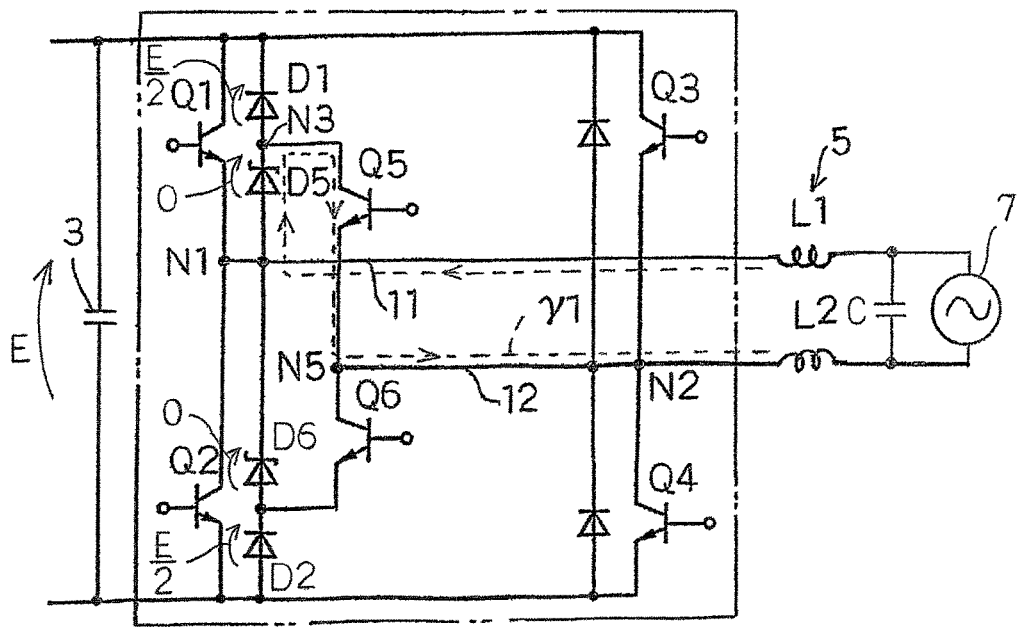

As shown by a broken-line arrow γ1 in FIG. 5B, when the transistor Q2 is OFF, due to the separation transistor Q5 being ON, current flows between the flywheel-and-separation diode D5 and the separation transistor Q5, whereby the reactors L1 and L2 are short-circuited. As a result, as in the above case, it is not necessary to set the dead time. When the transistor Q2 is OFF, since ON signals are given to the separation transistors Q5 and Q6, voltages applied to the flywheel diodes D1 and D2 connected in series to the flywheel-and-separation diodes D5 and D6 are each E/2 (row (6) in FIG. 7).

Figure 6A:
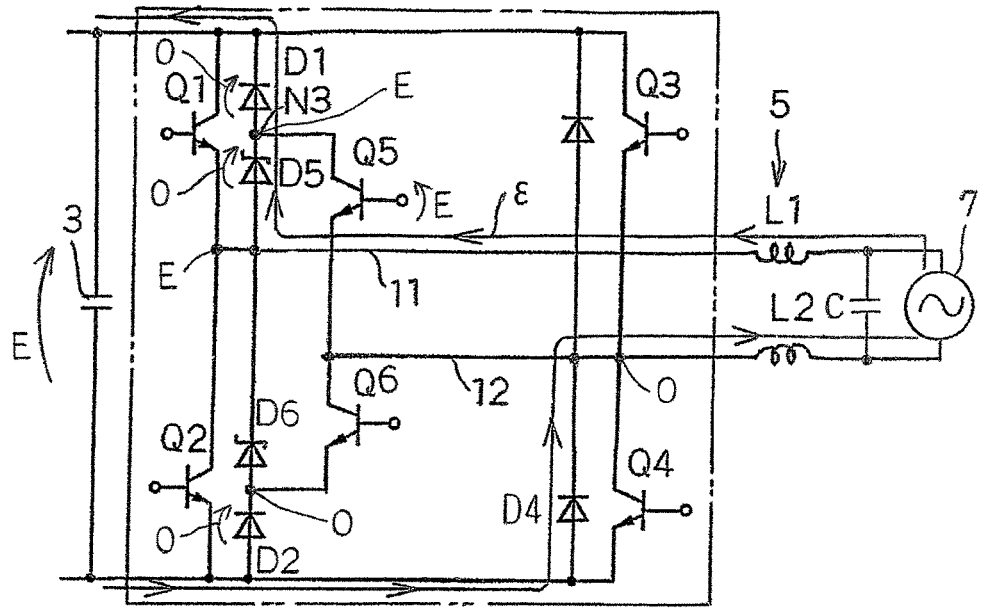
FIG. 6A and FIG. 6B are circuit diagrams showing operations of the inverter circuit in FIG. 1.

In the mode IV in FIG. 2, as shown by a solid-line arrow ε in FIG. 6A, ON/OFF signals are given to the transistors Q1 and Q4, and the separation transistor Q6 is constantly ON. During a flywheel period in which the flywheel diodes D1 and D4 and the flywheel-and-separation diode D5 are used, electromagnetic energy in the interconnection reactor returns to the DC side through the AC power source 7 and the diodes D1, D5, and D4. In this flywheel period, as the electromagnetic energy in the interconnection reactor for smoothing current decreases, current flow in the circuit disappears. At this time, current I≤0 and voltage V≥0 are satisfied. When the separation transistor Q5 is OFF and an ON signal is given to the transistor Q1, voltage applied to the flywheel diode D1 connected in reversely parallel thereto on the positive side of the smoothing capacitor 3 is 0 V (row (7) in FIG. 7). Meanwhile, the transistor Q2 is OFF and the separation transistor Q6 is ON, and therefore voltage applied to the flywheel diode D2 on the negative side of the smoothing capacitor 3 is 0 V (row (7) in FIG. 7).

Figure 6B:
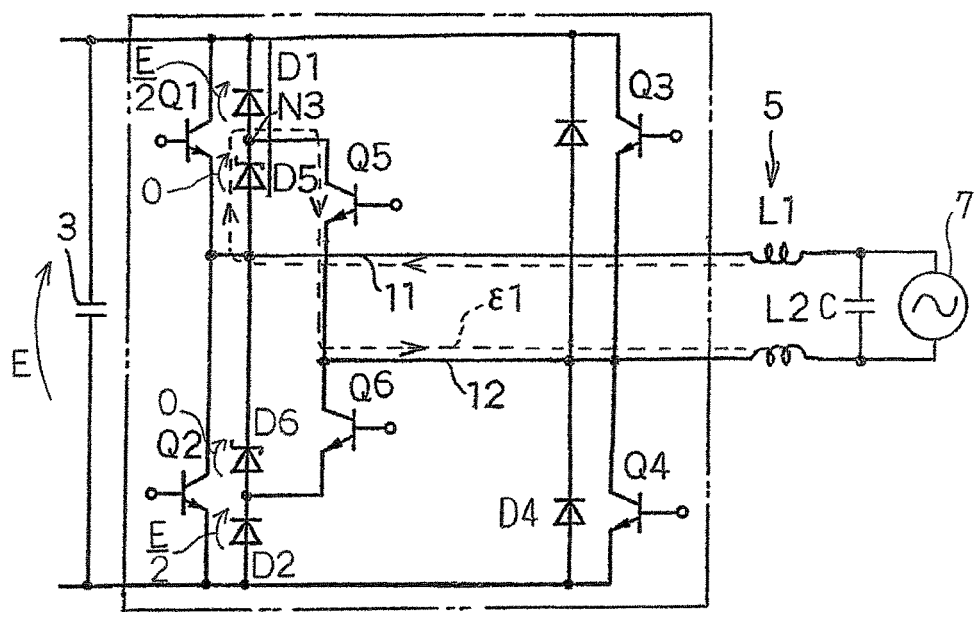

As shown in a broken-line arrow ε1 in FIG. 6B, when the transistors Q1 to Q4 are all OFF and the separation transistor Q5 is ON, current flows through the interconnection reactor L1, the separation transistor Q5, the flywheel-and-separation diode D5, and then the interconnection reactor L2, and thus the smoothing capacitor 3 and the interconnection reactor 5 are separated from each other during a flywheel period. When OFF signals are given to all the transistors Q1 to Q4, since ON signals are given to the separation transistors Q5 and Q6, voltages applied to the flywheel diodes D1 and D2 connected in series to the flywheel-and-separation diodes D5 and D6 are each E/2 (row (8) in FIG. 7).

As described above, as shown by the solid lines in the modes I to IV in rows (1), (3), (5), and (7) in FIG. 7, when ON signals are given to the transistors Q1 and Q2 to which ON/OFF signals are being given in PWM control, voltages applied to the flywheel diodes D1 and D2 connected in reversely parallel thereto are 0 V. As shown by the broken lines in the modes I and III in rows (2) and (6), when OFF signals are given to the transistors Q1 and Q2, since ON signals are given to the separation transistors Q5 and Q6, voltages applied to the flywheel diodes D1 and D2 connected in series to the flywheel-and-separation diodes D5 and D6 are each E/2 if these diodes have almost the same ON resistance. During a flywheel period, as shown by the broken lines in the modes II and IV in rows (4) and (8), when OFF signals are given to all the transistors Q1 to Q4, since ON signals are given to the separation transistors Q5 and Q6, similarly, voltages applied to the flywheel diodes D1 and D2 connected in series to the flywheel-and-separation diodes D5 and D6 are each E/2. Thus, in inverter operation, voltages that exceed E/2 are not applied to the flywheel diodes D1 and D2 connected in series to the flywheel-andseparation diodes D5 and D6, and therefore it becomes possible to reduce the withstand voltages of the flywheel diodes D1 and D2.

By switching on and off the two switch pairs in the bridge circuit 4 alternately and flowing current through the interconnection reactor 5 (L1, L2), it becomes possible to output AC power having a sinusoidal output waveform, and separate the smoothing capacitor 3 and the interconnection reactor 5 from each other by the separation circuit 6 during a flywheel period.

Thus, in the present invention, since each flywheel diode in the bridge circuit and each flywheel-and-separation diode in the separation circuit are connected in series, it becomes possible to separate the smoothing capacitor and the interconnection reactor from each other by the separation circuit, and reduce the withstand voltages of the flywheel diodes connected in series to the flywheel-and-separation diodes in the bridge circuit. In addition, since DC power of the solar battery which is a distributed power source is converted to AC power with high efficiency by the inverter circuit, a distributed power source system with a high power conversion efficiency is obtained.

Figure 8:
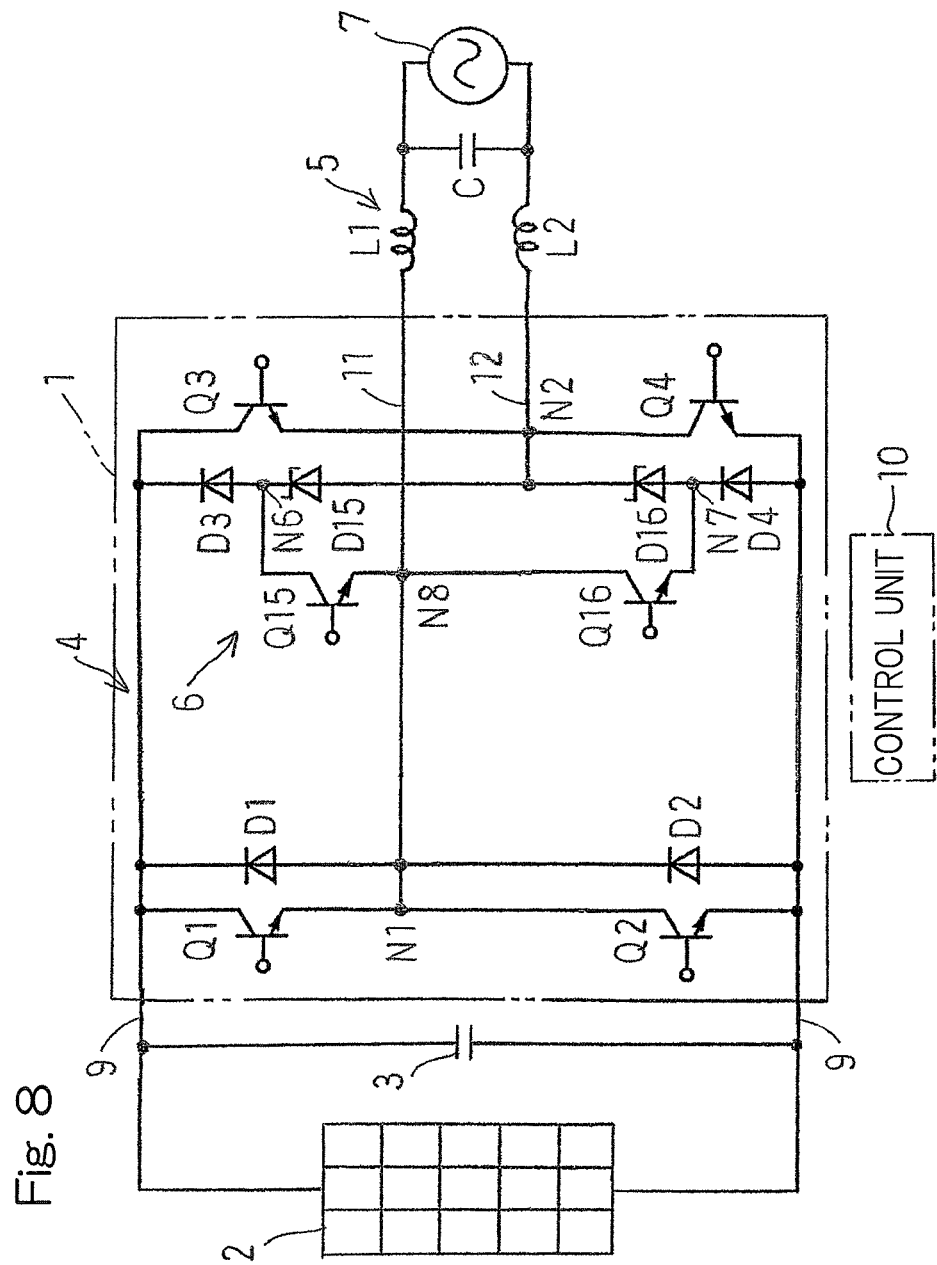
FIG. 8 is a circuit configuration diagram showing an inverter circuit according to modification 1.
Figure 9:
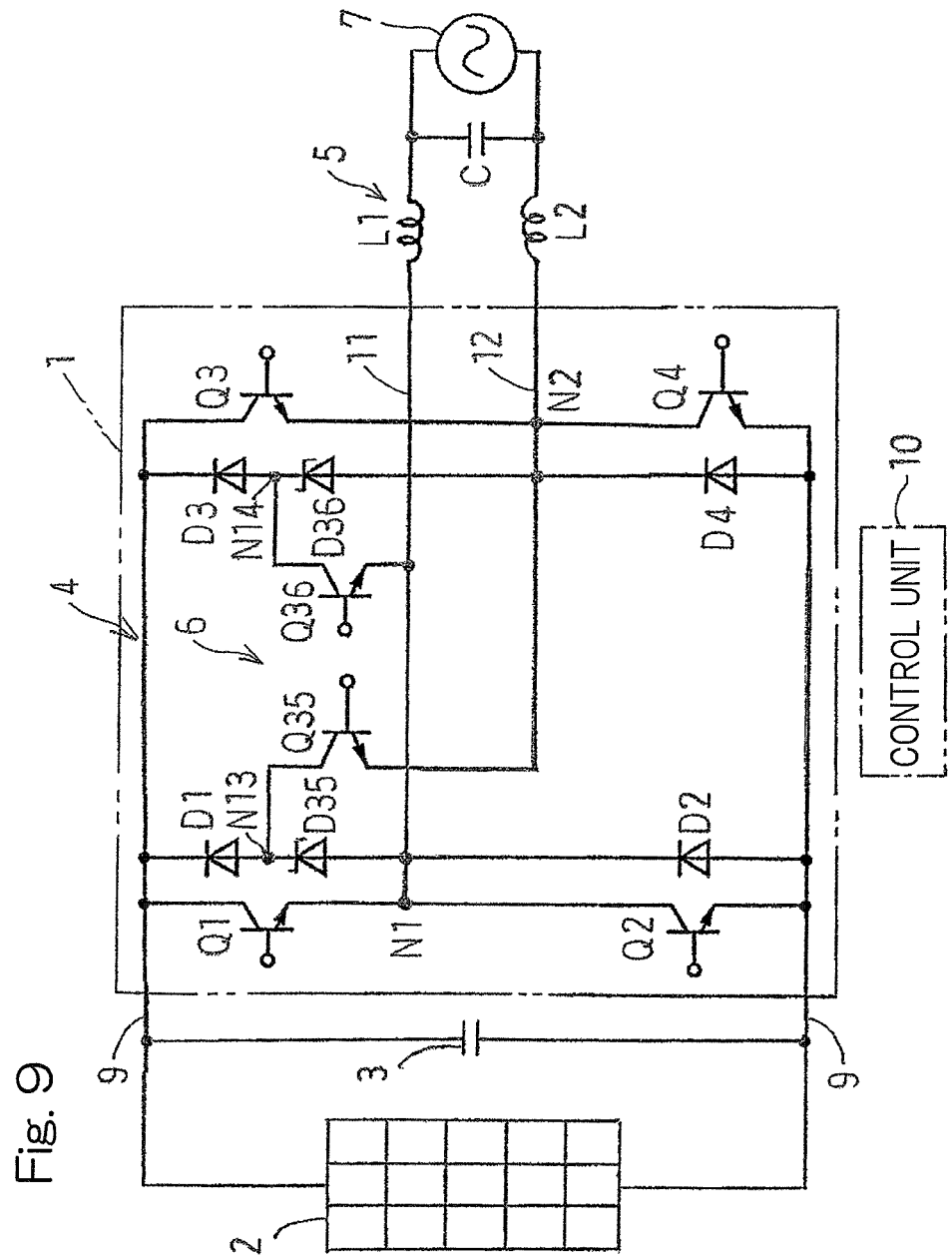
FIG. 9 is a circuit configuration diagram showing an inverter circuit according to modification 2.
Figure 10:
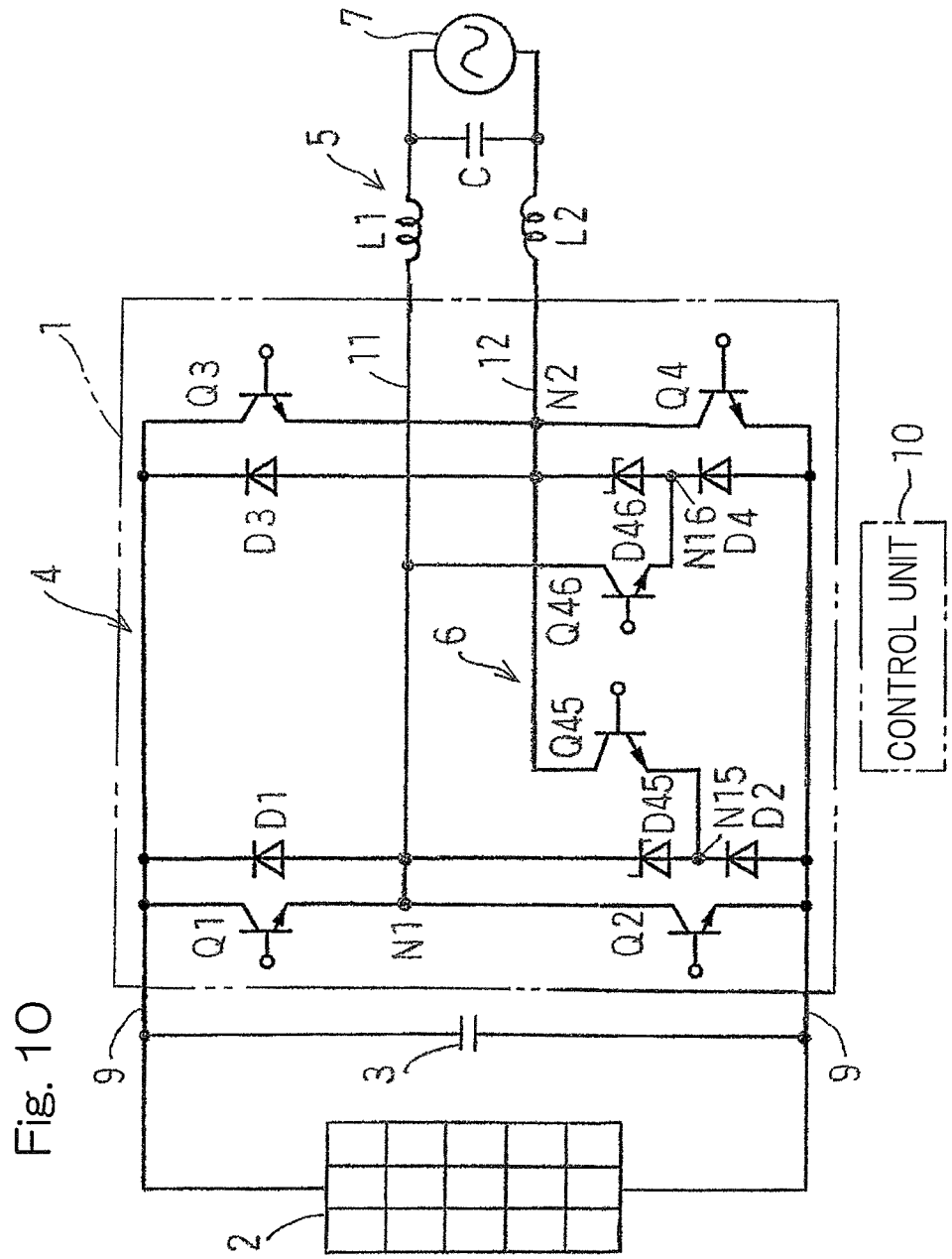
FIG. 10 is a circuit configuration diagram showing an inverter circuit according to modification 3.

FIG. 8 to FIG. 10 show modifications 1 to 3 of the inverter circuit 1 according to the first embodiment in FIG. 1. In modifications 1 to 3 , the configuration other than the inverter circuit 1 is the same as in FIG. 1, and therefore the description thereof is omitted.

In modification 1 in FIG. 8, the flywheel diode D3 and a flywheel-and-separation diode D15 are connected in series, and the flywheel diode D4 and a flywheel-and-separation diode D16 are connected in series. A series connection point N6 between the flywheel diode D3 and the flywheel-and-separation diode D15 is connected to the collector of a separation transistor Q15, and a series connection point N7 between the flywheel diode D4 and the flywheel-and-separation diode D16 is connected to the emitter of a separation transistor Q16. The emitter of the separation transistor Q15 and the collector of the separation transistor Q16 are connected to each other, the AC output line 11 is connected to a connection point N8 therebetween, and to the connection point N1 between the emitter of the transistor Q1 and the collector of the transistor Q2. The emitter of the transistor Q3 and the collector of the transistor Q4 are connected to each other, and the AC output line 12 is connected to the connection point N2 therebetween. That is, in FIG. 8, instead of the two upper and lower paired arms at the left in the bridge circuit 4 as in FIG. 1, on the two upper and lower paired arms at the right, the flywheel-and-separation diodes D15 and D16 are connected in series to the flywheel diodes D3 and D4, respectively.

In the mode II, the separation transistor Q15 is turned on, current flows through the interconnection reactor L2, the flywheel-and-separation diode D15, the separation transistor Q15, and then the interconnection reactor L1, and thus the smoothing capacitor 3 and the interconnection reactor 5 are separated from each other during a flywheel period. In the mode IV, the separation transistor Q16 is turned on, current flows through the interconnection reactor L1, the separation transistor Q16, the flywheel-and-separation diode D16, and then the interconnection reactor L2, and thus the smoothing capacitor 3 and the interconnection reactor 5 are separated from each other during a flywheel period.

As in the first embodiment, in modification 1 , by respectively connecting the flywheel diodes D3 and D4 and the flywheel-and-separation diodes D15 and D16 in series, the withstand voltages of the flywheel diodes D3 and D4 can be reduced, energy loss is reduced as much as possible, and an inverter circuit with low cost and high power conversion efficiency is obtained.

In modification 2 in FIG. 9, the flywheel diode D1 and a flywheel-and-separation diode D35 are connected in series, and the flywheel diode D3 and a flywheel-and-separation diode D36 are connected in series. A series connection point N13 between the flywheel diode D1 and the flywheel-and-separation diode D35 is connected to the collector of a separation transistor Q35, and a series connection point N14 between the flywheel diode D3 and the flywheel-and-separation diode D36 is connected to the collector of the separation transistor Q16. The AC output line 12 is connected to the emitter of the separation transistor Q35, and to the connection point N2 between the emitter of the transistor Q3 and the collector of the transistor Q4. The AC output line 11 is connected to the emitter of the separation transistor Q36, and to the connection point N1 between the emitter of the transistor Q1 and the collector of the transistor Q2. That is, among four upper and lower arms of the bridge circuit 4, in this example, on the two right and left paired arms on the upper side, the flywheel-and-separation diodes D35 and D36 are connected in series to the flywheel diodes D1 and D3, respectively.

In the mode II, the separation transistor Q36 is ON, current flows through the interconnection reactor L2, the flywheel-and-separation diode D36, the separation transistor Q36, and then the interconnection reactor L1, and thus the smoothing capacitor 3 and the interconnection reactor 5 are separated from each other during a flywheel period. In the mode IV, the separation transistor Q35 is ON, current flows through the interconnection reactor L1, the flywheel-and-separation diode D35, the separation transistor Q35, and then the interconnection reactor L2, and thus the smoothing capacitor 3 and the interconnection reactor 5 are separated from each other during a flywheel period.

As in the first embodiment, in modification 2 , by respectively connecting the flywheel diodes D1 and D3 and the flywheel-and-separation diodes D35 and D36 in series, the withstand voltages of the flywheel diodes D1 and D3 are reduced, energy loss is reduced as much as possible, and an inverter circuit with low cost and high power conversion efficiency is obtained.

In modification 3 in FIG. 10, the flywheel diode D2 and a flywheel-and-separation diode D45 are connected in series, and the flywheel diode D4 and a flywheel-and-separation diode D46 are connected in series. A series connection point N15 between the flywheel diode D2 and the flywheel-and-separation diode D45 is connected to the emitter of a separation transistor Q45, and a series connection point N16 between the flywheel diode D4 and the flywheel-and-separation diode D46 is connected to the emitter of a separation transistor Q46. The AC output line 12 is connected to the collector of the separation transistor Q45, and to the connection point N2 between the emitter of the transistor Q3 and the collector of the transistor Q4. The AC output line 11 is connected to the collector of the separation transistor Q46, and to the connection point N1 between the emitter of the transistor Q1 and the collector of the transistor Q2. That is, in FIG. 10, instead of the two right and left paired arms on the upper side in the bridge circuit 4 as in FIG. 9, on the two right and left paired arms on the lower side, the flywheel-and-separation diodes D45 and D46 are connected in series to the flywheel diodes D2 and D4, respectively.

In the mode II, the separation transistor Q45 is ON, current flows through the interconnection reactor L2, the separation transistor Q45, the flywheel-and-separation diode D45, and then the interconnection reactor L1, and thus the smoothing capacitor 3 and the interconnection reactor 5 are separated from each other during a flywheel period. In the mode IV, the separation transistor Q46 is ON, current flows through the interconnection reactor L1, the separation transistor Q46, the flywheel-and-separation diode D46, and then the interconnection reactor L2, and thus the smoothing capacitor 3 and the interconnection reactor 5 are separated from each other during a flywheel period.

As in the first embodiment, in modification 3, by respectively connecting the flywheel diodes D2 and D4 and the flywheel-and-separation diodes D45 and D46 in series, the withstand voltages of the flywheel diodes D2 and D4 are reduced, energy loss is reduced as much as possible, and an inverter circuit with low cost and high power conversion efficiency is obtained.

Figure 11:
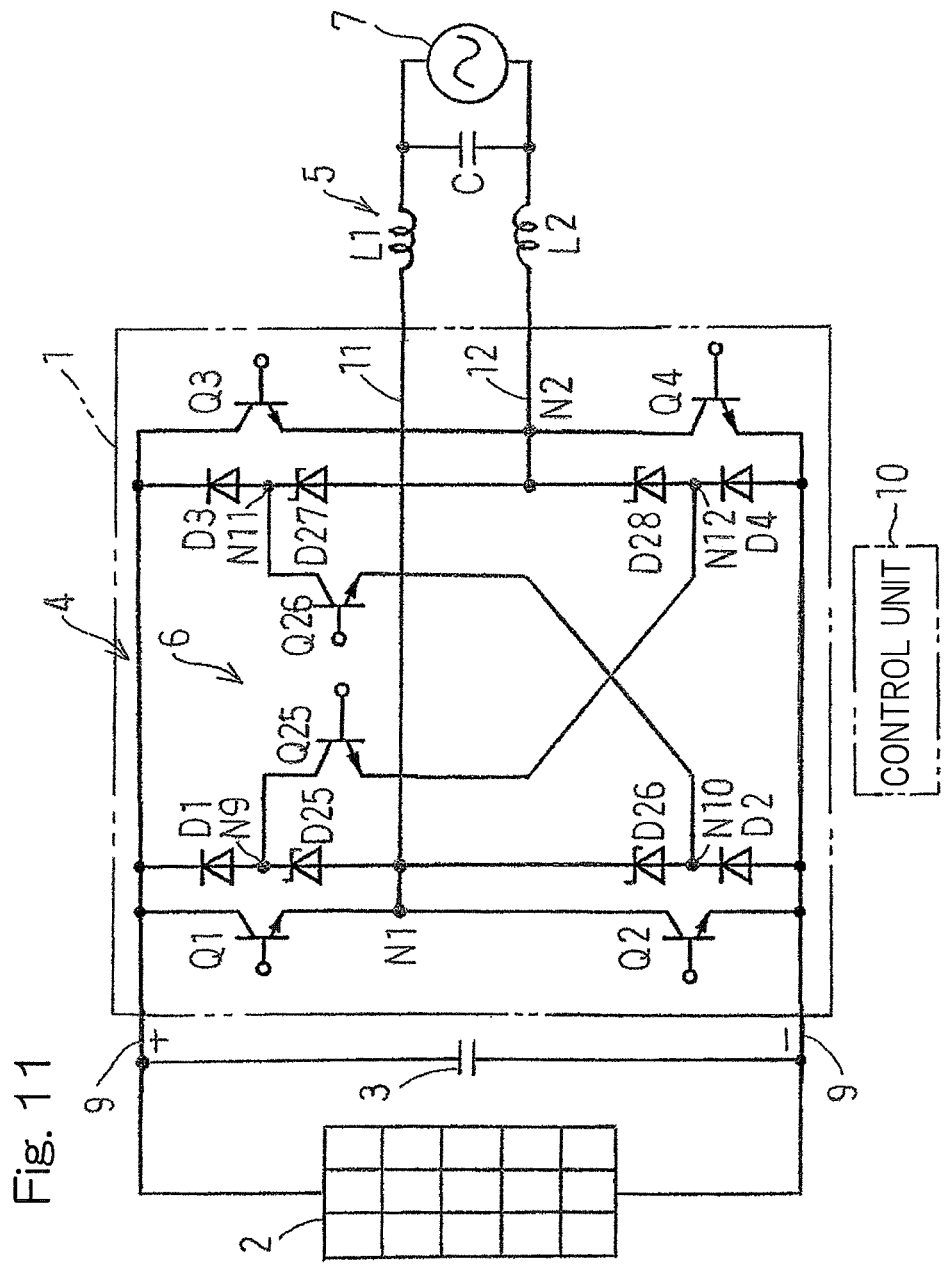
FIG. 11 is a circuit configuration diagram showing a distributed power source system including an inverter circuit according to the second embodiment of the present invention.

FIG. 11 is a circuit configuration diagram showing a distributed power source system including an inverter circuit according to the second embodiment. In the second embodiment, the separation circuit 6 includes two separation switching (transistor) elements Q25 and Q26 and four flywheel-and-separation diodes D25 to D28. Four series connection points N9 to N12 between the flywheel diodes D1 to D4 and the flywheel-and-separation diodes D25 to D28 are connected by two connection lines in a crossed manner via the separation transistors Q25 and Q26, and the separation transistors Q25 and Q26 and the AC output lines 11 and 12 are connected via the flywheel-and-separation diodes D26 and D28 so as to short-circuit the AC output lines 11 and 12.

As shown in FIG. 11, the flywheel diode D1 and the flywheel-and-separation diode D25 are connected in series, the flywheel diode D2 and the flywheel-and-separation diode D26 are connected in series, the flywheel diode D3 and the flywheel-and-separation diode D27 are connected in series, and the flywheel diode D4 and the flywheel-and-separation diode D28 are connected in series. The series connection point N9 between the flywheel diode D1 and the flywheel-and-separation diode D25 is connected to the collector of the separation transistor Q25. The emitter of the separation transistor Q25 is connected to the series connection point N12 between the flywheel diode D4 and the flywheel-and-separation diode D28. The series connection point N11 between the flywheel diode D3 and the flywheel-and-separation diode D27 is connected to the collector of the separation transistor Q26, and the emitter of the separation transistor Q26 is connected to the series connection point N10 between the flywheel diode D2 and the flywheel-and-separation diode D26. That is, the four series connection points N9 to N12 are connected by two connection lines in a crossed manner via the separation transistors Q25 and Q26. The AC output line 11 is connected to the connection point N1 between the emitter of the transistor Q1 and the collector of the transistor Q2, and the AC output line 12 is connected to the connection point N2 between the emitter of the transistor Q3 and the collector of the transistor Q4.

In the mode II, the separation transistor Q26 is ON, current flows through the interconnection reactor L2, the flywheel-and-separation diode D27, the separation transistor Q25, the flywheel-and-separation diode D26, and then the interconnection reactor L1, and thus the smoothing capacitor 3 and the interconnection reactor 5 are separated from each other during a flywheel period. In the mode IV, the separation transistor Q25 is ON, current flows through the interconnection reactor L1, the flywheel-and-separation diode D25, the separation transistor Q25, the flywheel-and-separation diode D28, and then the interconnection reactor L2, and thus the smoothing capacitor 3 and the interconnection reactor 5 are separated from each other during a flywheel period.

In the second embodiment, by respectively connecting the flywheel diodes D1, D2, D3, and D4 and the flywheel-and-separation diodes D25, D26, D27, and D28 in series, as in the first embodiment, the smoothing capacitor 3 and the interconnection reactor 5 can be separated from each other by the separation circuit 6, the withstand voltages of the flywheel diodes D1 to D4 can be reduced, and energy loss is reduced as much as possible. Thus, an inverter circuit with low cost and high power conversion efficiency is obtained.

For example, in the mode I in FIG. 3A and the mode IV in FIG. 6A, in which the DC voltage E of the smoothing capacitor 3 is applied to the flywheel-and-separation diode D5 in FIG. 1, actually, reverse current may flow through the flywheel-and-separation diode D5 though the reverse current is not great. The reverse current is divided into the flywheel diode D2 and the separation transistor Q6, and the divided currents flow through them as reverse currents. As a result, reverse voltages are generated on the flywheel diode D2 and the separation transistor Q6. In order to suppress the reverse voltages, a diode may be connected in reversely parallel to the separation transistor Q6. In the case where the separation transistor Q6 has a parasitic diode as in a MOSFET, the parasitic diode serves such a function. In the case where the separation transistor Q6 is a single IGBT or the like in which reversely parallel diodes are not contained, a diode through which reverse current flowing through the flywheel-and-separation diode D5 is to be flowed is connected, as reversely parallel diodes, to the single IGBT or the like.

The above also applies to, as well as the separation transistor Q6, the separation transistor Q5, the separation transistors Q15 and Q16 in FIG. 8, the separation transistors Q35 and Q36 in FIG. 9, the separation transistors Q45 and Q46 in FIG. 10, and the separation transistors Q25 and Q26 in FIG. 11.

Figure 12:
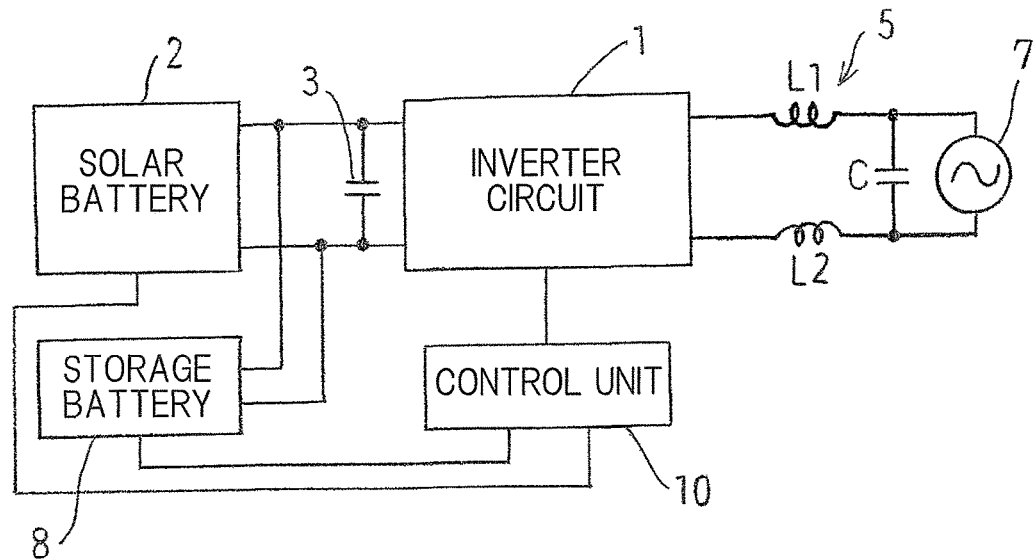
FIG. 12 is a circuit configuration diagram showing a distributed power source system with a storage battery, including an inverter circuit, according to the third embodiment of the present invention.
Figure 13:
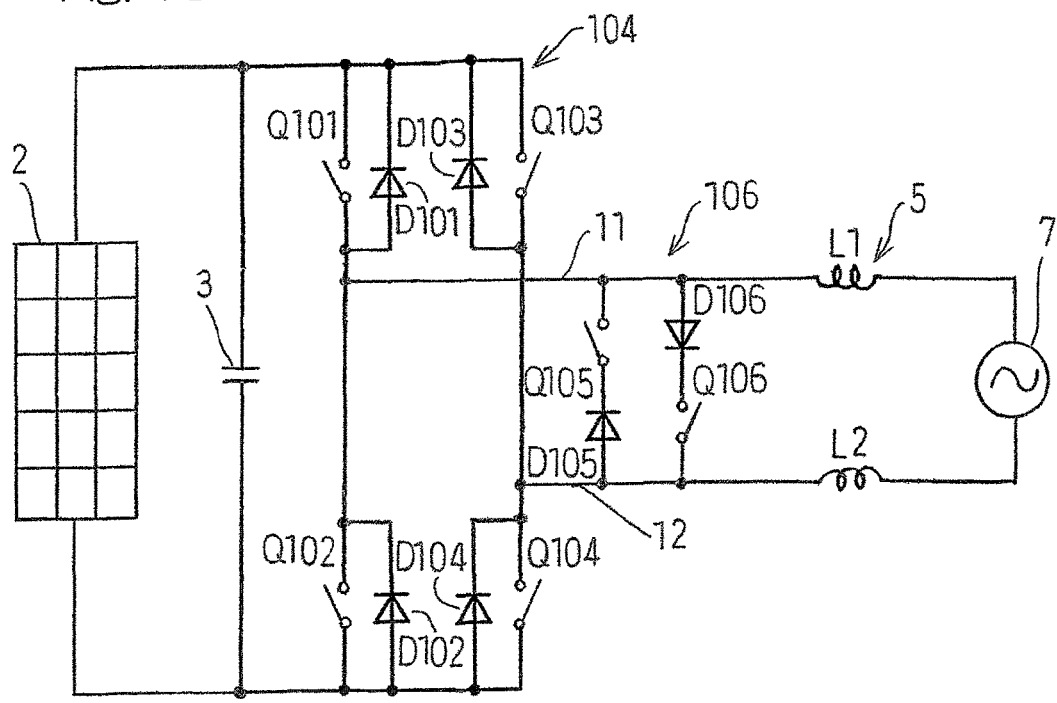
FIG. 13 is a circuit configuration diagram showing a conventional inverter circuit.

FIG. 12 is a circuit configuration diagram showing a distributed power source system with a storage battery including an inverter circuit, according to the third embodiment of the present invention. This system includes a storage battery for effectively utilizing power generated by a solar battery as in the case of, for example, performing peak cut by making compensation with power stored in the storage battery when the peak of power consumption is about to exceed an upper limit value. In this example, DC power of the solar battery which is a distributed power source is converted to AC power with high efficiency by the inverter circuit, and thus a distributed power source system with a storage battery having high power conversion efficiency is obtained.

As an uninterruptible power supply using the above inverter circuit 1, although not shown, the DC power source may be a distributed power source, and a storage battery for effectively utilizing power generated by the DC power source, and a bidirectional converter may be provided, so that the inverter circuit 1 operates as a converter/inverter to perform power conversion between the DC power source and/or the storage battery, and the AC power source. Thus, an uninterruptible power supply having high power conversion efficiency is obtained.

In the above embodiments, a solar battery has been used as a distributed power source. However, a fuel battery or the like may be used.

The inverter circuit may be operated as a high efficiency converter.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . inverter circuit
2 . . . solar battery (distributed power source)
3 . . . smoothing capacitor
4 . . . bridge circuit
5 . . . interconnection reactor
6 . . . separation circuit
7 . . . AC power source
8 . . . storage battery
10 . . . control unit
D1 to D4 . . . flywheel diode in bridge circuit
Q1 to Q4 . . . switching element (transistor) in bridge circuit
Q5, Q6 . . . separation switching element (separation transistor)
D5, D6 . . . flywheel-and-separation diode

What is claimed is:

1. An inverter circuit that converts DC power of a DC power source to AC power so as to be interconnected to a power system including an AC power source, the inverter circuit comprising:
   a smoothing capacitor on an input side, connected in parallel to the DC power source;
   a bridge circuit, configured to convert DC power to AC power, including
      four switching elements,
      four flywheel diodes connected reversely parallel to the switching elements, and
      two flywheel-and-separation diodes which are separation diodes which also serve as flywheel diodes, connected in series to two of the flywheel diodes;
   an interconnection reactor on an output side, provided on two AC output lines connecting the bridge circuit and the AC power source; and
   a separation circuit configured to separate the smoothing capacitor and the interconnection reactor from each other during a flywheel period of the flywheel diodes in the bridge circuit, wherein
   the separation circuit includes two separation switching elements and the two flywheel-and-separation diodes, and
   each of the two separation switching elements are connected between one of the two AC output lines and one of two series connection points between the flywheel diodes and the flywheel-and-separation diodes, so as to short-circuit the AC output lines;
   among the flywheel diodes and the flywheel-and-separation diodes mutually connected in series, the flywheel diodes are provided on a DC input line side, and the flywheel-and-separation diodes are provided on the AC output line side, in the bridge circuit, and
   withstand voltages of the respective flywheel diodes are set to be lower than withstand voltages of the flywheel-and-separation diodes.

2. The inverter circuit as claimed in claim 1, wherein
   the flywheel diodes are fast recovery diodes, and
   the flywheel-and-separation diodes are SiC Schottky barrier diodes or GaN Schottky barrier diodes.

3. The inverter circuit as claimed in claim 1, wherein
   the separation switching elements have a parasitic diode or a diode connected in reversely parallel.

4. The inverter circuit as claimed in claim 1, wherein
   the inverter circuit operates as an AC/DC converter.

5. A distributed power source system comprising the inverter circuit as claimed in claim 1, wherein
   the DC power source is a distributed power source.

6. The distributed power source system as claimed in claim 5, further, comprising:
   a storage battery configured to utilize power generated by the distributed power source.

7. An uninterruptible power supply comprising:
   the inverter circuit as claimed in claim 1, in which the DC power source is a distributed power source;
   a storage battery configured to utilize power generated by the DC power source; and
   a bidirectional AC/DC
   converter, wherein
   the inverter circuit operates as a converter/inverter to perform power conversion between the DC power source and/or the storage battery, and the AC power source.

* * * * *